US012545100B2

(12) United States Patent
Martin et al.

(10) Patent No.: US 12,545,100 B2
(45) Date of Patent: Feb. 10, 2026

(54) DRIVE AXLE FOR A VEHICLE

(71) Applicant: BorgWarner Sweden AB, Landskrona (SE)

(72) Inventors: R. Keith Martin, Ocala, FL (US); Calahan Campton, Royal Oak, MI (US); Robert Peacey, Evesham (GB); Michael Bryant, Brackley (GB)

(73) Assignee: BORGWARNER SWEDEN AB (SE)

( * ) Notice: Subject to any disclaimer, the term of this patent is extended or adjusted under 35 U.S.C. 154(b) by 0 days.

(21) Appl. No.: 18/689,506

(22) PCT Filed: Sep. 6, 2022

(86) PCT No.: PCT/EP2022/074759
§ 371 (c)(1),
(2) Date: Mar. 6, 2024

(87) PCT Pub. No.: WO2023/036782
PCT Pub. Date: Mar. 16, 2023

(65) Prior Publication Data
US 2024/0375507 A1 Nov. 14, 2024

(30) Foreign Application Priority Data
Sep. 7, 2021 (EP) .................................. 21195280

(51) Int. Cl.
| *F16H 37/08* | (2006.01) |
| *B60K 17/16* | (2006.01) |
| *B60K 1/00* | (2006.01) |
| *B60K 7/00* | (2006.01) |
| *B60K 17/04* | (2006.01) |

(52) U.S. Cl.
CPC .......... *B60K 17/16* (2013.01); *F16H 37/082* (2013.01); *B60K 2001/001* (2013.01); *B60K 2007/0092* (2013.01); *B60K 17/046* (2013.01)

(58) Field of Classification Search
CPC ............................ B60K 17/16; B60K 17/046; B60K 2001/001; B60K 2007/0092; F16H 37/082; F16H 2057/085; F16H 57/082; B60Y 2304/01
See application file for complete search history.

(56) References Cited

U.S. PATENT DOCUMENTS

| 8,727,928 B2 * | 5/2014 | Harashima | F16H 37/082 475/221 |
| 2010/0184552 A1 * | 7/2010 | Soybel | F16H 48/11 475/230 |
| 2021/0213819 A1 * | 7/2021 | Hibino | F16H 57/0424 |

FOREIGN PATENT DOCUMENTS

| EP | 731291 A2 * | 9/1996 | ........... F16H 37/082 |
| EP | 0731291 A3 | 9/1996 | |

(Continued)

*Primary Examiner* — Justin Holmes
(74) *Attorney, Agent, or Firm* — Dilworth IP, LLC

(57) ABSTRACT

A drive axle with a bevel gear differential having a differential cage as an input and two drive shafts as differential outputs. The differential cage is driven by a planet carrier of a planetary gear set, the planet carrier providing a plurality of planet shafts, each forming a stiff unit with two planet wheels stepped in diameter. The planet carrier is driven by a sun wheel and counter-acts with a static ring wheel. While the planet carrier drives the differential cage and orbits around the differential in its entirety, the differential is compactly disposed between the planet shafts.

13 Claims, 3 Drawing Sheets

(56) References Cited

FOREIGN PATENT DOCUMENTS

| FR | 3091737 A1 | * | 7/2020 | ............. B60K 6/387 |
| WO | WO-2020161979 A1 | * | 8/2020 | ............... B60K 1/00 |

* cited by examiner

DRIVE AXLE FOR A VEHICLE

TECHNICAL FIELD

The present invention relates to a drive axle for a vehicle with a bevel gear differential nested in a stepped planet stage of a planetary gear set.

BACKGROUND

In the field of motor vehicles, a large number of technical solutions with regard to drive axles has been developed.

The patent document EP 0 731 291 A2, for example, discloses a lubricating device for such a vehicle power transmission, which uses a mechanical oil pump driven by a rotating member of the power transmission. The respective system features a planetary gear set and a pinion differential, of which a differential cage is forming a static unit with a planet shaft of the planetary gear set and orbits around a drive shaft axis together with the planet shaft.

Still there is a demand of enhancing the performance and durability of such systems and at the same time of decreasing the size and assembly space required. Such technical problems are continuously subjected to industrial development.

In view of the above-mentioned example of the prior art, an improved drive axle for a vehicle is required.

SUMMARY

Accordingly, the objective underlying the invention disclosed herein is to eliminate deficiencies of the prior art. In particular, it aims at providing an improved drive axle for a vehicle that has a low packaging size and a high performance.

This objective is achieved by the technical subject-matter of the independent claim. Preferred embodiments of the invention can be gained from the dependent claims and the present disclosure in general.

A first aspect of the invention refers to a drive axle for a vehicle, comprising:
- a bevel gear differential with a differential housing forming a differential input;
- a first wheel drive shaft and a second wheel drive shaft that are connected to the bevel gear differential;
- a planetary gear set, comprising a static ring gear wheel and a stepped planet stage, wherein said bevel gear differential is at least in sections nested inside said stepped planet stage;
- a hollow drive shaft that comprises a sun gear wheel of said planetary gear set and is adapted to receive a motor drive torque and transmit said motor drive torque via the sun gear wheel to the stepped planet stage, wherein said hollow drive shaft is arranged concentric with the first wheel drive shaft; and wherein
- said stepped planet stage comprises a planet carrier axle carrying a larger planet gear wheel driven by the sun gear wheel and a smaller planet gear wheel engaged with the ring gear wheel.

According to the invention, said larger planet gear wheel, said smaller planet gear wheel and said planet carrier axle are forming a torsionally rigid unit and the differential input is connected to the planet carrier axle via a differential input bearing.

In other words, the invention refers to a drive axle for a left and a right wheel, wherein respective drive shafts of the left and right wheel are functionally connected via a bevel gear differential, of which a differential cage can be driven by a traction motor. The traction motor can supply a torque to the differential cage via a planetary gear set. The motor can deliver the torque to a sun gear wheel of the planetary gear set, which is then transmitted to a stepped planet reducer of the planetary gear set. Said planet reducer comprises two planet gear wheels, of which one has a larger diameter than the other one. The planet gear wheel with the larger diameter receives the torque from the sun gear wheel and transmits said torque to a planet shaft. The planet shaft is shared by the two planet gear wheels in a way that the planet gear wheels and the planet shaft are stiffly connected to each other. Thus, the larger planet gear wheel drives the planet shaft, which transmits the torque to the smaller planet gear wheel. As a consequence, the smaller planet gear wheel is driven, as well. The smaller planet gear wheel is engaged with a ring gear wheel of the planetary gear set, which is fixed and does not rotate. The ring gear wheel can for example be fixed to a housing or other appropriate component. Thus, the planet gear wheels and the planet shaft are commonly rotating about a longitudinal axis of the planet shaft on the one hand and, due to engagement with the ring gear wheel, all of these components are also driven transverse said longitudinal axis of the planet shaft on the other hand. The differential is arranged inside the stepped planet reducer, which means that the planet gear wheels and the planet shaft are rotating or orbiting around the differential, as they are driven transversely. A cage of the differential has a mechanical interface to the planet shaft via that the transverse movement is transmitted, thereby driving the differential cage in the manner of a crank to make the differential cage rotate. To compensate for the rotational movement of the planet shaft about its longitudinal axis relative the differential cage, the interface between the differential cage and the planet shaft comprises a differential input bearing. Due to this arrangement, the torque delivered by the motor is subjected to a total gear ratio of the planetary gear set via the sun gear wheel, the stepped planet reducer and the interface from the planet shaft to the differential cage.

As the larger planet gear wheel, the smaller planet gear wheel and the planet carrier axle are designed in a torsionally stiff manner and are therefore rotating as a unit about the longitudinal axis of the planet carrier axle, the abrasive effect of mechanically dynamic interfaces is reduced. This is for example observable with regard to previously known solutions, wherein stepped planet reducers are designed in the manner of a sleeve applied to a planet shaft.

In principle, a single bearing would be sufficient, which is embodied by the differential input bearing. This significantly enhances the durability and reduces the costs of the inventive drive axle disclosed herein.

It shall be noted that the expression that the larger planet gear wheel, smaller planet gear wheel and planet carrier axle are forming a torsionally rigid unit has to be understood in a functional sense and the term "unit" does not necessarily imply a one-piece design. However, it is of course possible to manufacture these components integrally. The same applies to the design of, for example, a housing or other component, the ring gear wheel is fixed with.

In case of the drive axle of the invention, the larger planet gear wheel, the smaller planet gear wheel and the planet carrier axle can be designed in a very compact manner in order to reduce the required packaging space. At the same time, a high total gear ratio can be achieved and the bevel gear differential can be compactly nested in the stepped planet stage.

The bevel gear differential being nested in the stepped planet stage means that it is surrounded by the stepped planet stage in a direction transverse a longitudinal axis of the wheel drive shafts and the bevel gear differential, respectively. Of course, the stepped planet stage may comprises more than one planet carrier axles. Preferably it comprises three such planet carrier axles, of which each one is connected to the differential housing in the described manner and of which each one is equipped with respective planet gear wheels being engaged with the sun gear wheel and the ring gear wheel in the described manner.

As a measure to determine the degree at which the bevel gear differential is nested inside the stepped planet stage, a length of the planet carrier axle could be taken as a proper reference for the length of the stepped planet stage. For the length of the bevel gear differential, it would be proper to refer to a distance between the bevel gears along the longitudinal axis of the bevel gear differential, that are connecting the wheel drive shafts to the differential. This distance could also be referred to as an axial extension of the bevel gear differential.

It shall be noted that all bearings referred to herein in general could be roller bearings or friction bearings. Further it shall be understood that the differential input could be further adapted to receive an additional torque from an additional torque source, such as additional motors. That way the inventive drive axle could be combined with a torque vectoring device, for example. For these additional purposes, additional interfaces could be provided via the differential cage.

In a preferred embodiment of the drive axle of the invention, the differential input is seated on the planet carrier axle in a flying manner. In other words, this means the differential input is applied to the planet carrier axle at a front face, for example in the manner of a cup.

Such a design contributes to a compact packaging size of the drive axle of the invention.

It is generally preferred to use roller bearings in the context of the invention disclosed herein. This way radial and axial forces can be properly absorbed and the system design is made very compact and durable.

In a preferred embodiment of the drive axle of the invention, the differential input bearing comprises a needle bearing. This significantly reduces the packaging size and the mass moment of inertia when the differential input and planet carrier axle are rotated.

In a preferred embodiment of the drive axle of the invention, said smaller and/or larger planet gear wheel is integrally manufactured with said planet carrier axle or connected to it in a stiff manner.

This allows for a weight and space optimized design and a manufacturing process at low technical effort.

In a preferred embodiment of the drive axle of the invention, the stepped planet stage is supported on the hollow drive shaft by a support bearing. Preferably, the support bearing comprises a needle bearing. By supporting the stepped planet stage on the hollow drive shaft, a counter-bearing is formed that reduces the level of mechanical stress imposed on the differential input bearing, especially in terms of pitching moments. This significantly contributes to reducing the dimensions of said differential input bearing. Also the efficiency of transmitting the torque between the sun gear wheel and the stepped planet stage is increased by accurate relative positioning. Further, the overall dynamic behaviour of the planetary gear set is improved. For example, vibrations are reduced and thus the efficiency and durability of the system are increased.

In a preferred embodiment of the drive axle of the invention, the stepped planet stage comprises a support structure rested on the support bearing. The support structure, in an exemplarily simple design, could be formed by a radial protrusion of the planet carrier axle rested on said support bearing. However, the support structure could also be assembled to the planet carrier axle as a separate part.

All this allows for a flexible arrangement of the stepped planet stage relative the hollow drive shaft.

It is preferred, though optional, to provide a connection between the support structure and the differential housing. Thereby, the stiffness of the drive axle of the invention is increased.

In a preferred embodiment of the drive axle of the invention, the support structure is connected to the planet carrier axle via a support structure bearing.

This allows for effective compensation of relative rotational speed between the planet carrier axle rotating about its longitudinal axis relative the support structure, while the support structure rotates around the hollow shaft and is rested on the support bearing.

In a preferred embodiment of the drive axle of the invention, the support bearing comprises a needle bearing or a bushing, allowing for a compact and stable design.

In a preferred embodiment of the drive axle of the invention, said bevel gear differential is nested by at least 70% of its axial extension inside the stepped planet stage. Even more preferred, this degree measures at least 80% and further more preferred at least 90%.

The higher this degree is chosen, the more compact is the design of the drive axle of the invention.

In an even further preferred embodiment of the drive axle of the invention, said bevel gear differential is nested entirely inside the stepped planet stage.

In a preferred embodiment of the drive axle of the invention, said bevel gear differential comprises three differential pinions, making the arrangement inside the differential mechanically very resistant against tilting and vibrations.

In a preferred embodiment of the drive axle of the invention, a traction motor is connected to the hollow drive shaft. Preferably, the traction motor comprises an electric drive.

In a preferred embodiment of the drive axle of the invention, the traction motor is concentrically arranged with the hollow drive shaft. Preferably, the traction motor is arranged around the hollow shaft, which can even be integrated with or formed by a motor shaft.

In a preferred embodiment of the drive axle of the invention, a total gear ratio of at least 10.5:1 is achieved. More preferably, a total gear ratio of at least 11:1 is achieved, even more preferred of at least 11.5:1, even more preferred of at least 12:1 and mostly preferred of at least 12.5:1.

The total gear ratio of the planetary gear set is described by the following formula:

$$R_{tot} = \omega_{DI}/\omega_{SGW}, \text{ where}$$

$R_{tot}$ is the total gear ratio of the planetary gear set,
$\omega_{DI}$ is the rotational movement of the differential input [revolutions per minute], and
$\omega_{SGW}$ is the rotational movement of the sun gear wheel [revolutions per minute].

Another aspect of the invention refers to a vehicle, comprising an inventive drive axle for a vehicle disclosed herein. The vehicle could be any vehicle using a drive axle and is not necessarily limited to driving wheels for land vehicles. The vehicle of the invention may comprise one or more of the inventive drive axles and could comprise other types of drive axles in addition. Preferably, the vehicle of the invention is an electrically driven land vehicle.

Summarizing the invention again in other words, it refers to a drive axle with a bevel gear differential having a differential cage as an input and two drive shafts as differential outputs. The differential cage is driven by a planet carrier of a planetary gear set, said planet carrier providing a plurality of planet shafts, each forming a stiff unit with two planet wheels stepped in diameter. The planet carrier is driven by a sun wheel and counter-acts with a static ring wheel. While the planet carrier drives the differential cage and orbits around the differential in its entirety, said differential is compactly disposed between the planet shafts.

Unless indicated otherwise, all embodiments described herein are compatible with each other and the beneficial technical effects apply respectively.

BRIEF DESCRIPTION OF THE DRAWINGS

The invention will be described in further detail below with reference to the accompanying drawings, in which.

DETAILED DESCRIPTION

Figure 1:
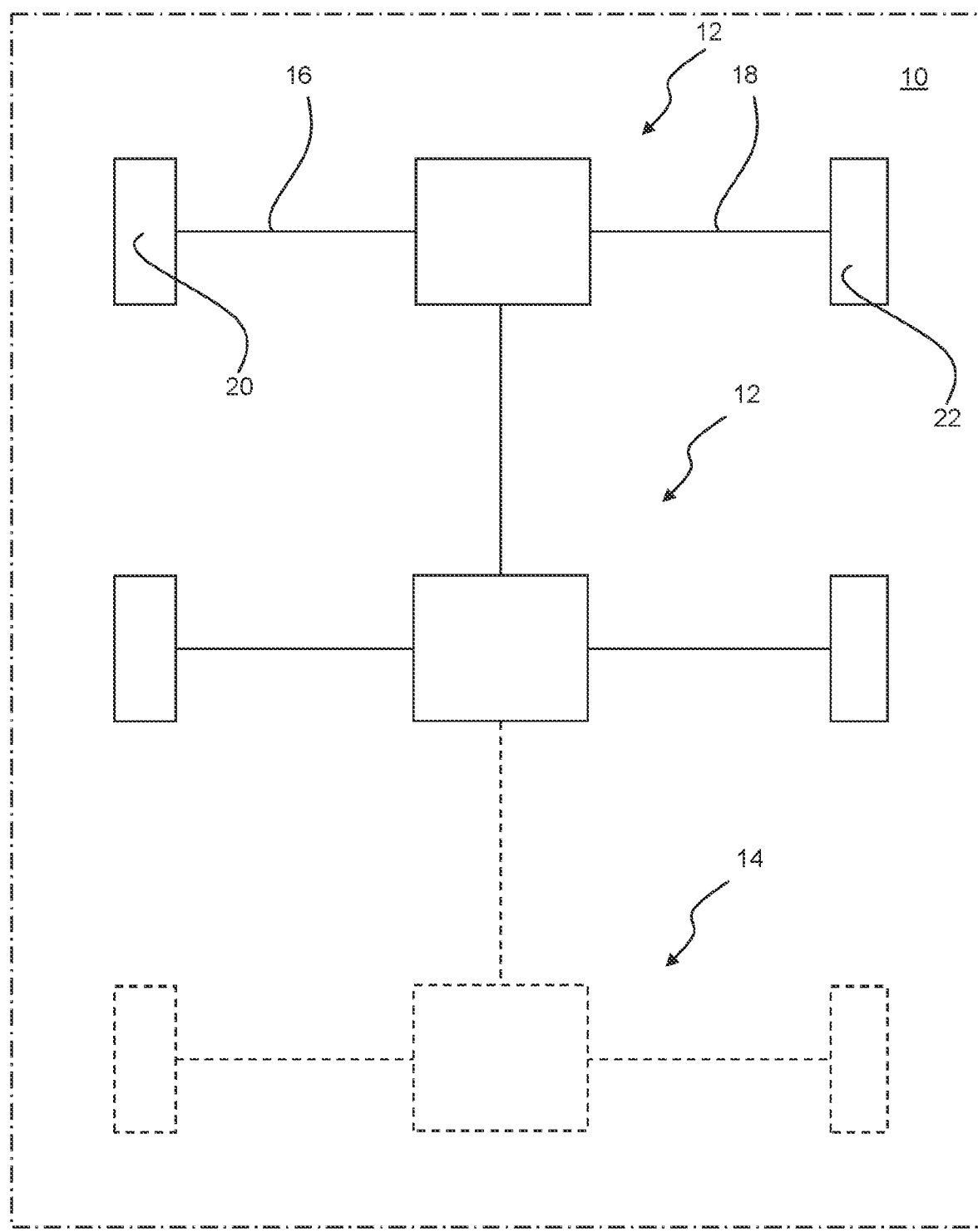
FIG. 1 is a schematic view of an embodiment of a vehicle.

Starting with FIG. 1, a vehicle 10 is shown. The vehicle 10 comprises a drive axle 12 according to the invention, which will be described in further detail with regard to FIGS. 2 and 3.

The vehicle 10 can be equipped with one or optionally more inventive drive axles 12, as indicated in FIG. 1. As an option, one or more conventional drive axles 14 can be provided in addition.

To provide an overview of the vehicle 10 in general, FIG. 1 shows the location of a first wheel drive shaft 16 and a second wheel drive shaft 18 of the drive axle 12 that are in case of the illustrated embodiment of the vehicle 10 connected to a first wheel 20 and second wheel 22 of the vehicle 10, respectively.

Figure 2:
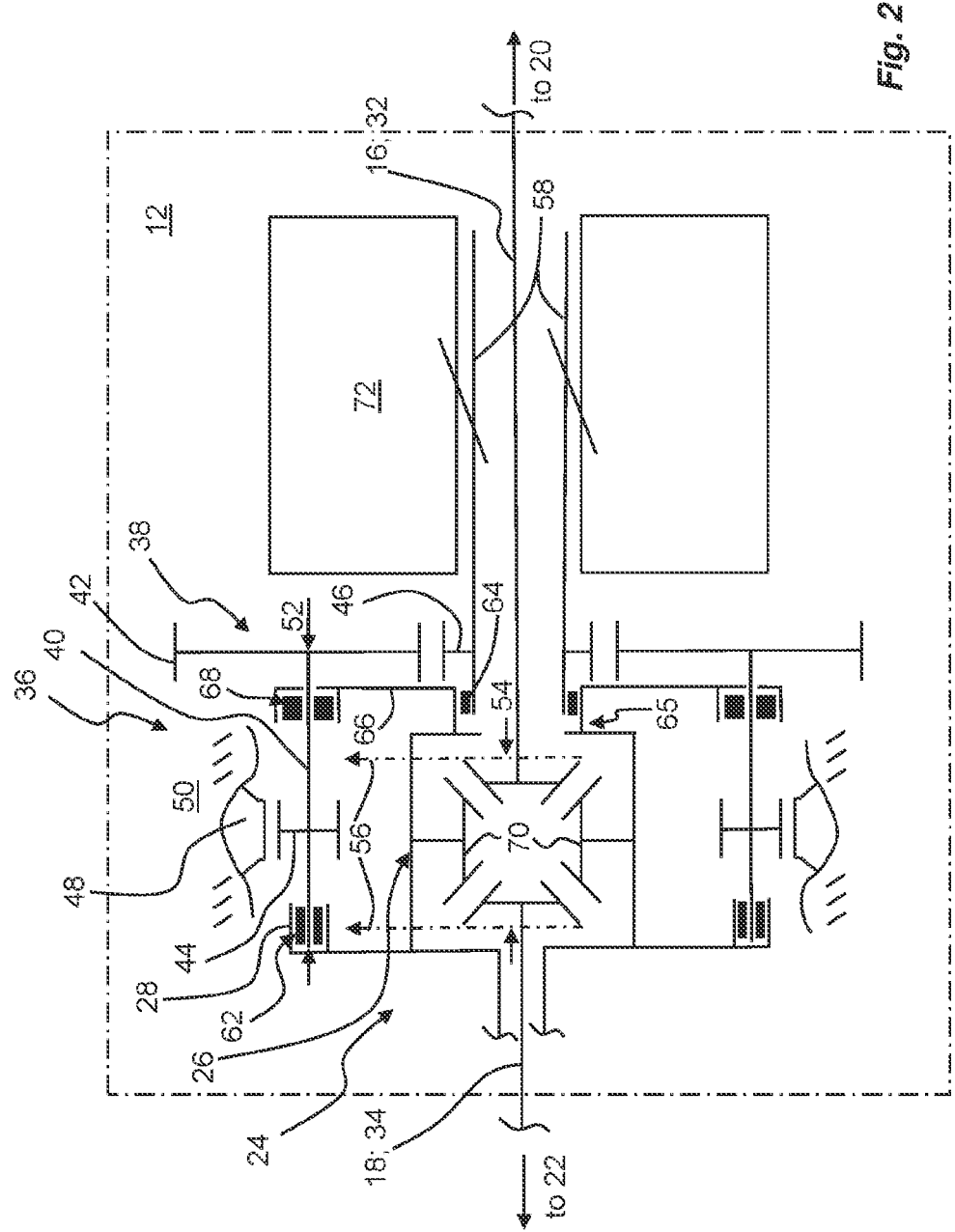
FIG. 2 is a schematic view of an embodiment of a drive axle for a vehicle.

Now turning to FIG. 2, a schematic view of an embodiment of a drive axle 12 according to the invention is shown. The drive axle 12 can for example be applied to the vehicle 10 shown in FIG. 1.

As schematically shown in FIG. 2, all drive axles 12 for a vehicle 10 that are covered by the idea of the invention essentially comprise a bevel gear differential 24 with a differential housing 26. The drive axle 12 further comprises the following essential features: The differential housing 26 is forming a differential input 28 and is designed to be rotatably driven via the differential input 28, if a respective motor drive torque 30 (see FIG. 3) is applied. Further, there is the first wheel drive shaft 16 and the second wheel drive shaft 18 connected to the bevel gear differential 24, thereby functioning as first and second differential outputs 32, 34.

The drive axle 12 further comprises a planetary gear set 36 with a stepped planet stage 38. The stepped planet stage 38 comprises a planet carrier axle 40 carrying a larger planet gear wheel 42 and a (relative the larger planet gear wheel 42) smaller planet gear wheel 44. The planetary gear set 36 further comprises a sun gear wheel 46 that is engaged with the larger planet gear wheel 42 and a ring gear wheel 48 in engagement with the smaller planet gear wheel 44. The ring gear wheel 48 is statically arranged. Merely as an example and therefore not essentially, the ring gear wheel 48 is illustrated fixed to a housing 50.

In the described arrangement, the bevel gear differential 24 is at least in sections nested inside said stepped planet stage 38. As shown in FIG. 2 and preferred, but not essential, the bevel gear differential 24 is nested entirely inside the stepped planet stage 38. The degree, at which the bevel gear differential 24 is nested inside the stepped planet stage 38, can be properly determined based on a length 52 of the planet carrier axle 40 and a length 54 of the bevel gear differential 24 and respectively the degree, at which a projection 56 of length 54 falls within length 52.

As can be seen in the preferred but not essential example illustrated in FIG. 2, the degree at which the bevel gear differential 24 is nested inside the stepped planet stage 38, is 100%. This is due to the projection 56 of length 54 totally lying within length 52. In other preferred embodiments, the bevel gear differential 24 can be nested by at least 70% inside the stepped planet stage 38.

Further, the drive axle 12 essentially comprises a hollow drive shaft 58 that carries the sun gear wheel 46 of the planetary gear set 36. The hollow drive shaft 58 is adapted to receive a motor drive torque 30 (see FIG. 3) and transmit said motor drive torque 30 via the sun gear wheel 46 to the stepped planet stage 38. The hollow drive shaft 58 is arranged concentric with the first wheel drive shaft 16.

Essentially, the larger planet gear wheel 42, the smaller planet gear wheel 44 and the planet carrier axle 40 are forming a torsionally rigid unit and the differential input 28 is connected to the planet carrier axle 40 via a differential input bearing 62.

The following features describe further preferred embodiments of the inventive drive axle 12 but are not essential to execute the invention.

For example, the differential input 28 can be seated on the planet carrier axle 40 in a flying manner, as shown in FIG. 2. Further preferred, the differential input bearing 62 may comprises a needle bearing.

In a preferred embodiment, the smaller 44 and/or larger planet gear wheel 42 is integrally manufactured with said planet carrier axle 40 or connected to it in a stiff manner.

Preferably, the stepped planet stage 38 is supported on the hollow drive shaft 58 by a support bearing 64, which is preferably comprising a needle bearing or a bushing. Even further preferred, the stepped planet stage 38 comprises a support structure 66, by which it is rested on the support bearing 64. Even though the support structure 66 could be made integrally with the planet carrier axle 40, it is preferred to assemble the support structure 66 to the planet carrier axle 40 via a support structure bearing 68. It is preferred, though optional, to provide a connection 65 between the support structure 66 and the differential housing 26 to increase the stiffness of the drive axle 12.

Preferably, the bevel gear differential 24 comprises three differential pinions 70, whereas in FIG. 2 only two differential pinions 70 are illustrated.

Further, the drive axle 12 preferably comprises a traction motor 72 being functionally connected to the hollow drive shaft 58. The traction motor 72 is preferably arranged concentrically with the hollow dive shaft 58.

Figure 3:
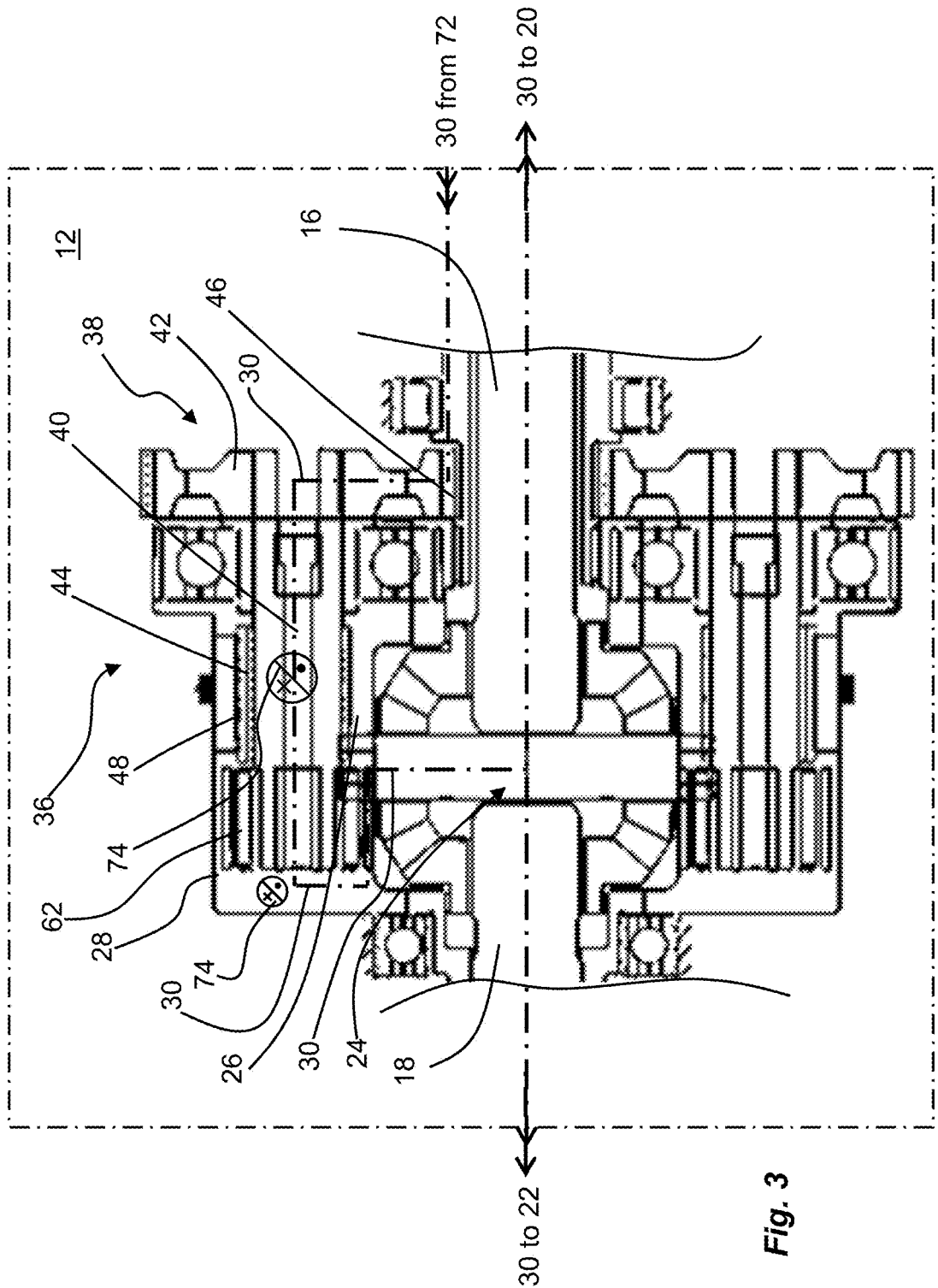
FIG. 3 is a schematic cross-sectional view of a drive axle for a vehicle according to the embodiment shown in FIG. 2.

Now turning to FIG. 3, the embodiment shown in FIG. 2 is illustrated in more detail and the function will be explained based on FIG. 3. Therefore, reference can be made to FIG. 2 at any time, in addition.

Again, the drive axle 12 is shown, wherein the respective drive shafts 16, 18 are functionally connected via a bevel gear differential 24. The differential housing 26 can be driven by the traction motor 72, which is not shown herein. The traction motor 72 supplies the motor drive torque 30 to the differential housing 26 via the planetary gear set 36. Therefore, the traction motor 72 delivers the motor drive torque 30 to the sun gear wheel 46 of the planetary gear set 36. The motor drive torque 30 is then transmitted to the stepped planet stage 38 and there received by the larger planet gear wheel 42. The motor drive torque 30 is then transmitted via the planet carrier axle 40 to the smaller planet gear wheel 44.

The smaller planet gear wheel 44 is engaged with the fixed ring gear wheel 48 and therefore drives the entire planet carrier axle 40 including the planet gear wheels 42, 44 to move transversely, as indicated by the illustrated movement vector 74. As the differential housing 26 features the differential input 28, that is in connection with the planet carrier axle 40, the differential input 28 is also rotated according to the illustrated movement vector 74.

The motor drive torque 30 is thus transferred to the differential housing 26 and rotates it.

As the planet carrier axle 40 rotates about its own longitudinal axis at the same time, which is due to the rotation induced via the larger planet gear wheel 42, said rotational movement relative the differential housing 26—and the differential input 28 in particular—has to be compensated. This is achieved by the differential input bearing 62.

Due to the shown arrangement, the motor drive torque 30 delivered by the traction motor 72 is passed on to the wheel drive shafts 16, 18 via the bevel gear differential 24. The motor drive torque 30 and the respective revolutions per minute are thereby subjected to a total gear ratio of the planetary gear set 36 via the sun gear wheel 46, the stepped planet stage 38 and the differential housing 26 via the differential input 28.

The invention claimed is:

1. A drive axle for a vehicle, comprising:
   a bevel gear differential with a differential housing forming a differential input;
   a first wheel drive shaft and a second wheel drive shaft that are connected to the bevel gear differential;
   a planetary gear set, comprising a static ring gear wheel and a stepped planet stage, wherein said bevel gear differential is at least in sections nested inside said stepped planet stage;
   a hollow drive shaft that comprises a sun gear wheel of said planetary gear set and is adapted to receive a motor drive torque and transmit said motor drive torque via the sun gear wheel to the stepped planet stage, wherein said hollow drive shaft is arranged concentric with the first wheel drive shaft;
   wherein said stepped planet stage comprises a planet carrier axle carrying a larger planet gear wheel driven by the sun gear wheel and a smaller planet gear wheel engaged with the static ring gear wheel,
   wherein said larger planet gear wheel, said smaller planet gear wheel and said planet carrier axle are forming a torsionally rigid unit and the differential input is connected to the planet carrier axle via a differential input bearing,
   wherein the stepped planet stage is supported on the hollow drive shaft by a support bearing,
   wherein the stepped planet stage comprises a support structure rested on the support bearing, and
   wherein the support structure is connected to the differential housing.

2. The drive axle according to claim 1, wherein the differential input is seated on the planet carrier axle in a flying manner.

3. The drive axle according to claim 1, wherein the differential input bearing comprises a needle bearing.

4. The drive axle according to claim 1, wherein at least one of said smaller or larger planet gear wheel is integrally manufactured with said planet carrier axle or connected to it in a stiff manner.

5. The drive axle according to claim 1, wherein the support structure is connected to the planet carrier axle via a support structure bearing.

6. The drive axle according to claim 1, wherein the support bearing comprises a needle bearing or a bushing.

7. The drive axle according to claim 1, wherein said bevel gear differential is nested by at least 70% of an axial extension of said bevel gear differential inside the stepped planet stage.

8. The drive axle according to claim 7, wherein said bevel gear differential is, regarding the axial extension, nested entirely inside the stepped planet stage.

9. The drive axle according to claim 1, wherein said bevel gear differential comprises three differential pinions.

10. The drive axle according to claim 1, wherein a traction motor is connected to the hollow drive shaft.

11. The drive axle according to claim 10, wherein the traction motor is concentrically arranged with the hollow drive shaft.

12. The drive axle according to claim 1, wherein a total gear ratio of at least 10.5:1 is achieved.

13. A vehicle, comprising the drive axle for the vehicle according to claim 1.

* * * * *